United States Patent
Kato et al.

(10) Patent No.: US 9,659,716 B2
(45) Date of Patent: May 23, 2017

(54) COLLECTOR AND ELECTRODE STRUCTURE, NON-AQUEOUS ELECTROLYTE CELL, ELECTRICAL DOUBLE LAYER CAPACITOR, LITHIUM ION CAPACITOR, OR ELECTRICAL STORAGE DEVICE USING SAME

(75) Inventors: Osamu Kato, Chiyoda-ku (JP); Sohei Saito, Chiyoda-ku (JP); Yukiou Honkawa, Chiyoda-ku (JP); Mitsuyuki Wasamoto, Chuo-ku (JP); Kenichi Kadowaki, Chuo-ku (JP); Satoshi Yamabe, Chuo-ku (JP)

(73) Assignees: UACJ Corporation, Tokyo (JP); UACJ Foil Corporation, Tokyo (JP)

( * ) Notice: Subject to any disclaimer, the term of this patent is extended or adjusted under 35 U.S.C. 154(b) by 98 days.

(21) Appl. No.: 14/235,785

(22) PCT Filed: Jul. 27, 2012

(86) PCT No.: PCT/JP2012/069118
§ 371 (c)(1),
(2), (4) Date: Jan. 28, 2014

(87) PCT Pub. No.: WO2013/018684
PCT Pub. Date: Feb. 7, 2013

(65) Prior Publication Data
US 2014/0178766 A1 Jun. 26, 2014

(30) Foreign Application Priority Data
Jul. 29, 2011 (JP) .................................. 2011-166390

(51) Int. Cl.
*H01G 11/48* (2013.01)
*H01G 11/28* (2013.01)
*H01G 11/68* (2013.01)
*H01M 4/66* (2006.01)
*H01M 10/052* (2010.01)
*H01G 11/38* (2013.01)

(52) U.S. Cl.
CPC ............ *H01G 11/48* (2013.01); *H01G 11/28* (2013.01); *H01G 11/68* (2013.01); *H01M 4/667* (2013.01); *H01M 4/668* (2013.01); *H01G 11/38* (2013.01); *H01M 4/661* (2013.01); *H01M 4/662* (2013.01); *H01M 10/052* (2013.01)

(58) Field of Classification Search
CPC ....... H01M 4/668; H01M 4/661; H01M 4/662
See application file for complete search history.

(56) References Cited

U.S. PATENT DOCUMENTS 5,824,120 A * 10/1998 Mitchell .................. H01M 4/13
29/623.1
8,385,051 B2 * 2/2013 Nakayama ............ H01G 9/0032
361/305

2007/0109722 A1 * 5/2007 Ohmori .................. H01G 11/24
361/502
2008/0176144 A1 7/2008 Iwama
2009/0029255 A1 * 1/2009 Ohmori ............... H01M 4/0404
429/231.1
2009/0111031 A1 4/2009 Hirose
2012/0148917 A1 6/2012 Kobayashi et al.
2012/0156562 A1 6/2012 Kobayashi et al.
2012/0156563 A1 6/2012 Kobayashi et al.
2012/0160128 A1 6/2012 Kobayashi et al.
2013/0316232 A1 11/2013 Iijima et al.

FOREIGN PATENT DOCUMENTS

| JP | 62-160656 A | 7/1987 |
|---|---|---|
| JP | 02-109256 A1 | 4/1990 |
| JP | 06-163030 A1 | 6/1994 |
| JP | 2007-226969 A | 9/2007 |
| JP | 2008-010320 A | 1/2008 |
| JP | 2008-060060 A | 3/2008 |
| JP | 2010-135338 A | 6/2010 |
| JP | 2010-272287 A | 12/2010 |

(Continued)

OTHER PUBLICATIONS

International Search Report mailed Oct. 16, 2012, issued in corresponding International Application No. PCT/JP2012/069118, filed Jul. 27, 2012, 2 pages.
Extended European Search Report mailed Dec. 9, 2014, issued in corresponding European Patent Application No. 12819839.7, filed Jul. 27, 2012, 6 pages.
Matsubara, H., "For the Production of Lithium Ion Secondary Battery for Test," Industrial Technology Center, Reference submitted by Third Party on Dec. 18, 2015, in corresponding Japanese Patent Application No. 2013-526876 filed Jul. 27, 2012, 4 pages.
Third Party Submission submitted on Dec. 18, 2015, in corresponding Japanese Patent Application No. 2013-526876, filed Jul. 27, 2012, 10 pages.
Third Party Submission submitted on Apr. 28, 2016, in corresponding Japanese Patent Application No. 2013-526876, filed Jul. 27, 2012, machine translation, 17 pages.
Office Action mailed Aug. 9, 2016, in corresponding Japanese Patent Application No. 2013-526876, filed Jul. 27, 2012, with machine translation, 14 pages.

*Primary Examiner* — Ula C Ruddock
*Assistant Examiner* — Thomas Parsons
(74) *Attorney, Agent, or Firm* — Christenson O'Connor Johnson Kindness PLLC

(57) ABSTRACT

Provided is a technique to confirm the performance of the conductive resin layer of a current collector without actually preparing an electrode structure, a non-aqueous electrolyte battery, an electrical double layer capacitor, a lithium ion capacitor, or an electrical storage device, and to confirm the performance of the conductive resin layer easily with high accuracy by a non-destructive test. A current collector includes a conductive substrate and a resin layer possessing conductivity, the resin layer being formed on at least one side of the conductive substrate. The resin layer possessing conductivity contains a resin and a conductive material containing carbon as a main component. When the color tone of the surface of the resin layer possessing conductivity is specified with L*a*b* color system, L* is 60 or lower, a* is −1.0 to 1.0, and b* is −1.0 to 3.0.

6 Claims, No Drawings

(56) References Cited

FOREIGN PATENT DOCUMENTS

| JP | 2011-023341 A | | 2/2011 |
|---|---|---|---|
| JP | 2011-086636 A | | 4/2011 |
| WO | WO2010/109783 | * | 9/2010 |
| WO | 2011024798 A1 | | 3/2011 |
| WO | 2011/074269 A1 | | 6/2011 |
| WO | 2012114835 A1 | | 8/2012 |

* cited by examiner

COLLECTOR AND ELECTRODE STRUCTURE, NON-AQUEOUS ELECTROLYTE CELL, ELECTRICAL DOUBLE LAYER CAPACITOR, LITHIUM ION CAPACITOR, OR ELECTRICAL STORAGE DEVICE USING SAME

TECHNICAL FIELD

The present invention relates to a current collector, an electrode structure using the same, a non-aqueous electrolyte battery, an electrical double layer capacitor, a lithium ion capacitor and to an electrical storage device.

BACKGROUND ART

Lithium ion batteries have been receiving a demand for charging and discharging at high speed and longer lifetime. It has been known that speed of charging and discharging as well as adhesion can be improved by enhancing the adhesion with the active material and the like by providing a conductive resin layer on the conductive substrate of the lithium ion secondary battery.

For example, Patent Literature 1 discloses an under coat layer using chitosan. In addition, Patent Literature 2 discloses using nitrocellulose, polymethyl methacrylate and the like as a binder in the active material layer of the negative electrode. Further, Patent Literature 3 discloses using polyvinylbutyral for the conductive resin layer. In Patent Literature 4, color tone of a paste including an active material used for the negative electrode is evaluated by the absorption spectrum in the visible region. Further, in Patent Literature 5, particle diameter of a carbon microparticle is specified.

CITATION LIST

Patent Literature

[Patent Literature 1] JP2008-60060A
[Patent Literature 2] JP2011-23341A
[Patent Literature 3] JPH2-109256A
[Patent Literature 4] JP2010-272287A
[Patent Literature 5] JPH6-163030A

SUMMARY OF INVENTION

Technical Problem

However, the conventional techniques disclosed in the afore-mentioned literatures still had room for improvement in view of the following points.

First of all, the performance of the afore-mentioned conductive resin layer used in lithium ion secondary battery is determined by the microscopic states of the coatings on the conductive substrate, dispersion state of the conductive material in the conductive resin layer, oxidization state of the resin and the like, and the effect from each of these factors functions in a complicated manner. Therefore, it had been difficult to predict the performance of the conductive resin layer by a simple method.

Secondly, when it was required to confirm the performance of the conductive resin layer used for the lithium ion secondary battery, it was necessary to confirm the performance after actually preparing the lithium ion secondary battery. Therefore, in a case where the performance was found to be in poor condition after the lithium ion secondary battery was actually prepared, the lithium ion secondary battery was discarded, which resulted in low production yield. In particular, an endurance test such as a test for measuring product lifetime of a lithium ion secondary battery and the like cannot be conducted without damaging the product. Therefore, it is necessary to pick out some samples from the product and conduct a destructing inspection, which results in increase of testing burden and manufacturing cost.

The present invention has been made in consideration of the afore-mentioned problems. An object of the present invention is to provide a technique which enables to confirm the performance of the conductive resin layer of the current collector without actually preparing an electrode structure, a non-aqueous electrolyte battery, an electrical double layer capacitor, a lithium ion capacitor, or an electrical storage device, and to confirm the performance of the conductive resin layer or the current collector with high accuracy by a non-destructive test.

Solution to Problem

According to the present invention, a current collector prepared by forming a resin layer possessing conductivity on at least one side of the conductive substrate is provided. Here, the resin layer possessing conductivity includes a resin and a conductive material containing carbon as its main component. In addition, when the color tone of the surface of the resin layer possessing conductivity is specified with $L^*a^*b^*$ color system, $L^*$ is 60 or lower, $a^*$ is $-1.0$ to $1.0$, and $b^*$ is $-1.0$ to $3.0$.

When a current collector which satisfies the color tone conditions as given above is used, the lithium ion battery or the electrical double layer capacitor prepared by using such current collector would realize superior high rate characteristics and long lifetime. This will be shown in the following Examples. Therefore, a current collector having superior performance can be selected with high accuracy merely by conducting a simple non-destructive test which measures the color tone conditions of the resin layer possessing conductivity, without actually preparing the lithium ion battery or the electrical double layer capacitor.

In addition, according to the present invention, an electrode structure comprising the afore-mentioned current collector; and an active material layer or an electrode material layer formed on the resin layer possessing conductivity, is provided.

Regarding the electrode structure of the present invention, a current collector having a superior performance is selected in advance with high accuracy by conducting a simple non-destructive test which measures the color tone conditions of the resin layer possessing conductivity. Therefore, by using such current collector, a lithium ion battery or an electrical double layer capacitor having superior high rate characteristics or a long lifetime can be manufactured at low cost and high manufacturing yield.

In addition, according to the present invention, a non-aqueous electrolyte battery, an electrical double layer capacitor, a lithium ion capacitor, or an electrical storage device which uses the afore-mentioned electrode structure is provided.

In these products, the color tone of the resin layer possessing conductivity is confirmed in advance in order to select the current collector having a superior performance. Such selection can be made with high accuracy by conducting a simple non-destructive test. Therefore, products having a superior high rate characteristics and long lifetime can be manufactured at low cost with high manufacturing yield.

Advantageous Effects of Invention

According to the present invention, a current collector having a superior performance can be selected with high accuracy by conducting a simple non-destructive test in advance which measures the color tone conditions of the resin layer possessing conductivity.

DESCRIPTION OF EMBODIMENTS

Hereinafter, the embodiment of the present invention will be explained in detail. Here, in the specification, "A to B" means "A or more and B or less". In addition, in the following description, number average molecular weight and weight average molecular weight mean the ones measured by GPC (gel permeation chromatography).

According to the present embodiment, a current collector comprising a conductive substrate and a resin layer possessing conductivity which is formed on at least one side of a conductive substrate, is provided. Here, the resin layer possessing conductivity contains a resin and a conductive material of which main component is carbon. Each of the constitutions will be described in detail hereinafter.

<1. Conductive Substrate>

As the conductive substrate of the present invention, various metal foils can be used. As the metal foil, known metal foils used for an electrode structure, a non-aqueous electrolyte battery, an electrical double layer capacitor, a lithium ion capacitor, or an electrical storage device can be used, without any particular limitation. For example, an aluminum foil or an aluminum alloy foil can be used. In addition, a copper foil, a stainless steel foil can be used, or a nickel foil can be used as a conductive substrate for a negative electrode. Here, an aluminum foil, an aluminum alloy foil and the like can be used for a high-voltage electrodes, such as those using lithium titanate as an active material. Among these, an aluminum foil, an aluminum alloy foil, and a copper foil are preferable from the viewpoint of its balance between the electrical conductivity and cost. The thickness of the foil can be adjusted depending on its application, and is preferably 7 to 100 µm, particularly preferably 10 to 50 µm. When the foil is too thin, the strength of the foil becomes insufficient, thereby causing difficulty in the coating process of the active material layer. On the other hand, when the foil becomes too thick, the active material layer or the electrode material layer must be made thin for such excess in the thickness, resulting in cases where sufficient capacity cannot be obtained.

<Resin Layer Possessing Conductivity>

The resin layer having conductivity used in the present embodiment (hereinafter referred to as "resin layer") is provided on one side or both sides of the afore-mentioned conductive substrate, and contains resin and a conductive material of which main component is carbon. Here, a conventionally known resin can be used as the resin. For example, from the viewpoint of adhesion with the conductive substrate and the active material, it is preferable that the resin contains either one of a soluble nitrocellulose-based resin, an acryl-based resin, or a chitosan-based resin.

The method for forming the resin layer possessing conductivity used in the present embodiment is not particularly limited. Here, it is preferable to coat a solution or a dispersion containing a binder resin and a conductive particle onto the conductive substrate. As the method for coating, a roll coater, a gravure coater, a slit dye coater and the like can be used. In addition, it is preferable that the resin used in the present embodiment contains either one of a soluble nitrocellulose-based resin, an acryl-based resin, or a chitosan-based resin. A conductive material (conductive particle) of which main component is carbon is added to the conductive resin layer in order to provide conductivity. Here, the characteristics of the conductive resin layer is determined by the microscopic states of the coatings on the conductive substrate, dispersion state of the conductive material in the conductive resin layer, oxidization state of the resin and the like, and the effect from each of these factors functions in a complicated manner. The present inventors have investigated the volume resistivity of the resin layer by adding the conductive material containing carbon as its main component to various resins, and have found that when the resin contains either one of the soluble nitrocellulose-based resin, the acryl-based resin or the chitosan-based resin, adhesion with the conductive substrate and the active material is superior. In addition, the baking temperature of the resin layer possessing conductivity is preferably 100 to 250° C., and the baking time is preferably 10 to 60 seconds. Here, the baking temperature is the final temperature of conductive substrate. When the baking temperature is lower than 100° C., the soluble nitrocellulose-based resin would not harden sufficiently, and when the baking temperature exceeds 250° C., there are cases where the adhesion with the active material layer decreases.

<2-1. Soluble Nitrocellulose-Based Resin>

In the present embodiment, the soluble nitrocellulose-based resin is a resin containing a soluble nitrocellulose as a resin component. Here, the soluble nitrocellulose-based resin may contain only the soluble nitrocellulose, or may contain a resin other than the soluble nitrocellulose. The soluble nitrocellulose is one type of cellulose which is a polysaccharide, and is characterized by possessing a nitro group. Although soluble nitrocellulose is a cellulose having a nitro group, in contrast with other celluloses such as CMC and the like, the soluble nitrocellulose is not widely used in electrodes, and have been conventionally used as a raw material of resin film or coatings.

The inventors of the present invention have found that high rate characteristics of a non-aqueous electrolyte battery can be greatly improved by first obtaining a soluble nitrocellulose-based resin composition by dispersing a conductive material in this soluble nitrocellulose, and then forming a resin layer containing the soluble nitrocellulose-based resin and the conductive material on the conductive substrate. The Nitrogen density of the soluble nitrocellulose used in the present invention is 10 to 13%, especially preferably 10.5 to 12.5%. When the Nitrogen density is too low, dispersion may not be sufficient depending on the type of conductive material. When the Nitrogen density is too high, the soluble nitrocellulose becomes chemically unstable, which would be dangerous when used for batteries. The Nitrogen density depends on the number of nitro group, and thus the Nitrogen density can be adjusted by adjusting the number of the nitro group. In addition, the viscosity of the soluble nitrocellulose is usually in the range of 1 to 6.5 second, preferably 1.0 to 6 seconds when observed by JIS K-6703. The acid content is preferably 0.006% or lower, especially preferably 0.005% or lower. When these values are not in such range, dispersibility of the conductive material and the battery characteristics may degrade.

The soluble nitrocellulose-based resin of the present embodiment can contain the soluble nitrocellulose by 100 parts by mass or other resin component may be used in combination. When the other resin component is used in combination, it is preferable that the soluble nitrocellulose-based resin is contained by 20 parts by mass or more, and is particularly preferable that the soluble nitrocellulose-based resin is contained by 25 parts by mass or more, with respect to the total resin component. Through an investigation conducted for the resistance of the resin layer prepared by adding a conductive material to various resins, it became apparent that when the soluble nitrocellulose-based resin is contained by 20 parts by mass or more, the resistance of the resin layer can be greatly reduced, and sufficient high rate characteristics can be obtained. It is assumed that this result was obtained since when the amount of soluble nitrocellulose formulated is too small, improvement in dispersibility of the conductive material, which is obtained as an effect of formulating the soluble nitrocellulose, may not be obtained. Addition of 20 parts by mass or more of the soluble nitrocellulose-based resin can sufficiently lower the resistance of the resin layer.

The soluble nitrocellulose-based resin of the present embodiment can be added with various resins in addition to the afore-mentioned soluble nitrocellulose. In the present invention, battery performance (including capacitor performance, hereinafter the same) was investigated to find that it is preferable to add a melamine-based resin, an acryl-based resin, a polyacetal-based resin, or an epoxy-based resin in combination. By such addition, the battery performance can be improved at a level equal to or higher than the case where the soluble nitrocellulose is used as a resin component by 100 parts by mass. Addition of such resins will be each described hereinafter.

The soluble nitrocellulose-based resin preferably contains a melamine-based resin. It is assumed that the work hardening of the resin is improved, adhesion with the conductive substrate is improved, and the battery performance is improved, since the melamine-based resin undergoes a crosslinking reaction with the soluble nitrocellulose. The amount of the melamine-based resin being added shall be, 5 to 200 mass %, more preferably 10 to 150 mass %, when the soluble nitrocellulose as the resin component is taken as 100 mass %. When the amount added is less than 5 mass %, the effect is low. When the amount added exceeds 200 mass %, the resin layer becomes too hard. This would cause detachment during the cutting and winding processes, and there may be a case where the discharge rate characteristics decrease. As the melamine-based resin, butylated melamine, isobutylated melamine, methylated melamine and the like can be preferably used for example. The number average molecular weight of the melamine-based resin is, for example, 500 to 50,000, particularly for example 500, 1,000, 2,000, 2,500, 3,000, 4,000, 5,000, 10,000, 20,000, or 50,000. The number average molecular weight may be in the range of two values selected from the values exemplified above.

The soluble nitrocellulose-based resin preferably contains an acryl-based resin. The afore-mentioned acryl-based resin has superior adhesion especially with aluminum and copper. Therefore, addition of the acryl-based resin can improve the adhesion with the conductive substrate. The amount of the acryl-based resin being added shall be, 5 to 200 mass %, more preferably 10 to 150 mass %, when the soluble nitrocellulose as the resin component is taken as 100 mass %. Here, the weight of the soluble nitrocellulose is a weight obtained by subtracting the weight of the wetting agent. When the amount added is less than 5 mass %, the effect is low. When the amount added exceeds 200 mass %, adverse effect is caused on the dispersibility of the conductive material. This may lead to a case where the discharge rate characteristics decreases. As the acryl-based resin, a resin containing acrylic acid, methacrylic acid, and derivatives thereof as a main component, or an acrylic copolymer including such monomers can preferably be used. In particular, methyl acrylate, ethyl acrylate, methyl methacrylate, isopropyl methacrylate and their copolymer can be used. In addition, acryl-based compounds having a polar group, such as acrylonitrile, methacrylonitrile, acryl amide, methacryl amide and the like, and a copolymer thereof can preferably be used. The weight average molecular weight of the acryl-based resin is, for example, 30,000 to 1,000,000, particularly for example 30,000, 40,000, 50,000, 60,000, 70,000, 80,000, 90,000, 100,000, 150,000, 200,000, 300,000, 400,000, 500,000, 600,000, 700,000, 800,000, 900,000, or 1,000,000. The weight average molecular weight may be in the range of two values selected from the values exemplified above.

The soluble nitrocellulose-based resin preferably contains a polyacetal-based resin. The afore-mentioned polyacetal-based resin is superior in compatibility with the soluble nitrocellulose. Therefore, suitable flexibility can be provided to the resin layer, and thus adhesion with the mixture layer after winding can be improved. The amount of the polyacetal-based resin being added shall be, 5 to 200 mass %, more preferably 20 to 150 mass %, when the soluble nitrocellulose as the resin component is taken as 100 mass %. When the amount added is less than 5 mass %, the effect is low. When the amount added exceeds 200 mass %, adverse effect is caused on the dispersibility of the conductive material. This may lead to a case where the discharge rate characteristics decrease. As the polyacetal-based resin, polyvinylbutyral, polyacetoacetal, polyvinylacetoacetal and the like can preferably be used. The weight average molecular weight of the polyacetal-based resin is, for example, 10,000 to 500,000, particularly for example 10,000, 20,000, 30,000, 40,000, 50,000, 60,000, 70,000, 80,000, 90,000, 100,000, 150,000, 200,000, or 500,000. The weight average molecular weight may be in the range of two values selected from the values exemplified above.

The soluble nitrocellulose-based resin preferably contains an epoxy-based resin. Since the epoxy-based resin is superior in adhesion with metal, the adhesion with the conductive substrate can be further improved by adding the epoxy-based resin. The amount of the epoxy-based resin being added shall be, 5 to 200 mass %, more preferably 10 to 150 mass %, when the soluble nitrocellulose as the resin component is taken as 100 mass %. When the amount added is less than 5 mass %, the effect is low. When the amount added exceeds 200 mass %, adverse effect is caused on the dispersibility of the conductive material. This may lead to a case where the discharge rate characteristics decrease. As the epoxy-based resin, glycidyl ether type resins such as bisphenol A type epoxy, bisphenol F type epoxy, tetramethylbiphenyl type and the like are preferable. The weight average molecular weight of the epoxy-based resin is, for example, 300 to 50,000, particularly for example 300, 500, 1,000, 2,000, 3,000, 4,000, 5,000, 10,000, 20,000, or 50,000. The weight average molecular weight may be in the range of two values selected from the values exemplified above.

As discussed, the soluble nitrocellulose-based resin preferably contains a soluble nitrocellulose, and at least one resin selected from the group consisting of a melamine-based resin; an acryl-based resin, a polyacetal-based resin, and an epoxy-based resin.

In addition, the soluble nitrocellulose-based resin preferably contains a melamine-based rein, a soluble nitrocellulose, and at least one resin selected from the group consisting of an acryl-based resin and a polyacetal-based resin. By such combination, the discharge rate characteristics become particularly superior. In addition, it is further preferable that the amount of the melamine-based resin is 10 to 40 mass %, and the amount of the soluble nitrocellulose is 50 to 70 mass %, when the total amount of the acryl-based resin, the polyacetal-based resin, the melamine-based resin, and the soluble nitrocellulose is taken as 100 mass %. In such case, the discharge rate characteristics become further superior.

<2-2. Acryl-Based Resin>

The acryl-based resin used in the present embodiment is formed from the monomers whose main component is acrylic acid, methacrylic acid, or derivatives thereof. The ratio of the acrylic component contained in the monomer of the acryl-based resin is for example 50 mass % or more, preferably 80 mass % or more. The upper limit is not particularly defined, and the monomer of the acryl-based resin may substantially contain only the acrylic component. In addition, the monomer of the acryl-based resin may contain one or more types of the acrylic component.

Among the acryl-based resin, an acryl copolymer containing as a monomer at least one of a methacrylic acid, a derivative thereof, and an acryl-based compound having a polar group. This is since when the acryl-based copolymer includes such monomer, high rate characteristics can be further improved. As the methacrylic acid or a derivative thereof, methacrylic acid, methyl methacrylate, ethyl methacrylate, isopropyl methacrylate and the like can be mentioned. As the acryl-based compound having a polar group, acrylonitrile, methacrylonitrile, acrylamide, methacrylamide and the like can be mentioned. Here, among the acryl-based compound having a polar group, an acryl compound having an amide group is preferable. As the acryl compound having an amide group, acrylamide, N-methylol acrylamide, diacetone acrylamide and the like can be mentioned.

The weight average molecular weight of the acryl-based resin used in the present embodiment is, for example, 30,000 to 1,000,000, particularly for example 30,000, 40,000, 50,000, 60,000, 70,000, 80,000, 90,000, 100,000, 150,000, 200,000, 300,000, 400,000, 500,000, 600,000, 700,000, 800,000, 900,000, or 1,000000. The weight average molecular weight may be in the range of two values selected from the values exemplified above. When the molecular weight is too small, the flexibility of the resin layer becomes low, resulting in occurrence of cracks in the resin layer when the current collector is wound with a small radius of curvature. This would lead to decrease in capacity of the battery and the like. When the molecular weight is too large, adhesion tends to lower. Weight average molecular weight can be measured with the resin solution before the addition of the conductive material, by using GPC (gel permeation chromatography). Here, the afore-mentioned weight average molecular weight means the ones measured by GPC (gel permeation chromatography).

<2-3. Chitosan-Based Resin>

In the present embodiment, the chitosan-based resin is a resin including a chitosan derivative as the resin component. As the chitosan-based resin, a resin including a chitosan derivative by 100 mass % can be used, however, other resin component can be used in combination. When the other resin is used in combination, it is preferable that the chitosan derivative is contained by 50 mass % or higher, more preferably 80 mass % or higher with respect to the total resin component. As the chitosan derivative, for example, hydroxy alkyl chitosan, hydroxyl ethyl chitosan, hydoroxy propyl chitosan, hydroxyl butyl chitosan, and grycerylated chitosan and the like can be mentioned.

The chitosan-based resin preferably contains an organic acid. As the organic acid, pyromellitic acid, terephthalic acid and the like can be mentioned. The amount of the organic acid added is preferably 20 to 300 mass % with respect to the 100 mass % of the chitosan derivative, and is more preferably 50 to 150 mass %. When the amount of organic acid added is too small, the hardening of the chitosan derivative becomes insufficient. When the amount of organic acid added is too large, flexibility of the resin layer degrades.

The weight average molecular weight of the chitosan derivative is, for example, 30,000 to 500,000, particularly for example 30,000, 40,000, 50,000, 60,000, 70,000, 80,000, 90,000, 100,000, 150,000, 200,000 or 500,000. The weight average molecular weight may be in the range of two values selected from the values exemplified above. The weight average molecular weight is obtained by GPC (gel permeation chromatography).

<2-4. Conductive Material having Carbon as Main Component>

The current collector functions as a pathway of electrons which moves from the electrode to the opposite electrode, and thus electron conductivity is required at its surface. The soluble nitrocellulose-based resin, the acryl-based resin and the chitosan derivative are all insulating materials, and thus a conductive material containing carbon as the main component need be added in order to provide electron conductivity. As the conductive particle used in the present embodiment, any conductive material may be used so long as it is a conductive material containing carbon as the main component. Here, carbon powder (carbon fine particle) is preferable. As the carbon powder, acetylene black, Ketjen black, furnace black, carbon nanotube and the like can be used. In addition, carbon fibers and carbon nanotubes can be used so long as they have conductivity. Among these, acetylene black, having a relatively long aggregate and thus achieving improvement in conductivity with relatively small amount of addition, is preferably used. By saving the amount of acetylene black added, decrease in adhesion with the active material layer or the electrode material layer can be suppressed. The amount of the conductive particles added is preferably 20 parts by mass or more and 80 parts by mass or less with respect to 100 parts by mass of the resin in the resin layer. When the amount is less than 20 parts by mass, the resistance of the resin layer becomes high, and when the amount exceeds 80 parts by mass, the adhesion of the surface of the resin layer with the active material layer or the electrode material layer becomes low. The conductive material can be dispersed in the resin solution by using a planetary mixer, a ball mill, a homogenizer, and the like.

<3. Color Tone of Resin Layer Surface>

Regarding the current collector of the present embodiment, the color tone of the surface of the resin layer possessing conductivity specified with L*a*b* color system is as follows. That is, L* is 60 or lower, a* is −1.0 to 1.0, and b* is −1.0 to 3.0. Here, it is preferable that the surface of the resin layer possessing conductivity is not covered with another layer comprising other materials, and is exposed externally. When the surface of the resin layer possessing conductivity is exposed externally, the color tone of the surface of the resin layer possessing conductivity can be measured without providing any treatment to the surface. That is, it is preferable that the color tone is measured in a condition where there is nothing covering the surface of the resin layer possessing conductivity.

When a current collector which satisfies the color tone conditions as given above is used, the lithium ion battery or the electrical double layer capacitor prepared by using such current collector would realize superior high rate characteristics and long lifetime. Therefore, a current collector having superior performance can be selected with high accuracy merely by conducting a simple non-destructive test which measures the color tone conditions of the resin layer possessing conductivity, without actually preparing the lithium ion battery or the electrical double layer capacitor.

The L*a*b* color system is a color specification system which is generally used to represent the color of a substance. This system was standardized in 1976 by International Commission on Illumination (CIE), and is adopted in Japan as JIS (JIS Z8729). In the L*a*b* color system, lightness is expressed with L*, and chromaticity showing color phase and saturation are expressed with a* and b*, respectively. a* and b* each shows the direction of the color, where a* shows the direction of red, −a* shows the direction of green, b* shows the direction of yellow, and −b* shows the direction of blue.

The method for measuring with the L*a*b* color system is not particularly limited, and such measurement can be conducted in accordance with JIS (JIS Z8729) using an arbitrary measuring apparatus. For example, a color meter (SM-3-MCH, available from Suga Test Instruments Co., Ltd.) can be used, with the measuring conditions of: measurement mode d/8 and aperture 30 mmΦ, to measure L*, a*, and b*.

Among the color tone of the surface of the resin layer possessing conductivity, when L* is 60 or lower, a fine balance is realized by a complex transaction of the effects from each factors of the microscopic states of the coatings on the conductive substrate, dispersion state of the conductive material in the conductive resin layer, oxidization state of the resin and the like, provided that the values of a* and b* are in the predetermined range. Accordingly, it is preferable since when a current collector which satisfies the color tone conditions as given above is used, the lithium ion battery or the electrical double layer capacitor prepared by using such current collector would realize superior high rate characteristics and long lifetime. Here, the value of L* may be in the range of two values selected from 8, 9, 10, 11, 12, 23, 14, 15, 20, 25, 30, 35, 40, 45, 50, 55, 56, 57, 58, 59, and 60.

In addition, among the color tone of the surface of the resin layer possessing conductivity, when a* is −1.0 to 1.0, a fine balance is realized by a complex transaction of the effects from each factors of the microscopic states of the coatings on the conductive substrate, dispersion state of the conductive material in the conductive resin layer, oxidization state of the resin and the like, provided that the values of L* and b* are in the predetermined range. Accordingly, it is preferable since when a current collector which satisfies the color tone conditions as given above is used, the lithium ion battery or the electrical double layer capacitor prepared by using such current collector would realize superior high rate characteristics and long lifetime. Here, the value of a* may be in the range of two values selected from −1.00, −0.90, −0.80, −0.70, −0.60, −0.50, −0.40, −0.30, −0.20, −0.10, 0.00, 0.10, 0.20, 0.30, 0.40, 0.50, 0.60, 0.70, 0.80, 0.90, and 1.00.

In addition, among the color tone of the surface of the resin layer possessing conductivity, when b* is −1.0 to 3.0, a fine balance is realized by a complex transaction of the effects from each factors of the microscopic states of the coatings on the conductive substrate, dispersion state of the conductive material in the conductive resin layer, oxidization state of the resin and the like, provided that the values of L* and a* are in the predetermined range. Accordingly, it is preferable since when a current collector which satisfies the color tone conditions as given above is used, the lithium ion battery or the electrical double layer capacitor prepared by using such current collector would realize superior high rate characteristics and long lifetime. Here, the value of b* may be in the range of two values selected from −1.00, −0.90, −0.80, −0.70, −0.60, −0.50, −0.40, −0.30, −0.20, −0.10, 0.00, 0.50, 1.00, 1.50, 2.00, 2.50, 2.60, 2.70, 2.80, 2.90, and 3.00.

Further, it is preferable that the afore-mentioned color tone satisfies the following conditions, with respect to the thickness t (μm) of the resin layer possessing conductivity.

$$-5t+25 \leq L^* \leq -5t+70$$

$$-0.01t-0.3 \leq a^* \leq -0.01t+0.7$$

$$0.01t \leq b^* \leq 0.01t+1$$

As described, when a current collector which satisfies the color tone conditions of: L* being 60 or lower, a* being −1.0 to 1.0, and b* being −1.0 to 3.0 as given above is used, the lithium ion battery or the electrical double layer capacitor prepared by using such current collector would realize superior high rate characteristics and long lifetime, at a level sufficient for the actual use. However, the present inventors have thought that the thickness t (μm) of the resin layer possessing conductivity should also be taken into consideration in order to realize a further superior high rate characteristics and long lifetime, since the thickness of the resin layer have an influence in combination of the influences of the microscopic states of the coatings on the conductive substrate, dispersion state of the conductive material in the conductive resin layer, oxidization state of the resin and the like. Here, film thickness measuring machine "HAKAT-TARO G" (available from SEIKO-em) can be used to calculate the thickness of the resin layer as a difference in the thickness between the portion formed with the resin layer and the portion without the resin (portion only with the aluminum foil).

The present inventors have made a study to realize a further superior high rate characteristics or a long lifetime, by determining the conditions for L*, a*, and b*, when the thickness t (μm) of the resin layer possessing conductivity varies. Accordingly, the present inventors have found that when L*, a*, and b* satisfies the following conditions, with respect to the thickness t (μm) of the resin layer possessing conductivity, a further superior high rate characteristics or a long lifetime can be realized.

That is, among the color tone of the surface of the resin layer possessing conductivity, when L* satisfies the condition of −5t+25≤L*≤−5t+70, a fine balance is realized by the effects from each factors of the microscopic states of the coatings on the conductive substrate, dispersion state of the conductive material in the conductive resin layer, oxidization state of the resin and the like having an influence on each other, provided that the values of a* and b* are in the predetermined range with respect to the thickness t (μm) of the resin layer possessing conductivity. Accordingly, it is preferable since when a current collector which satisfies the color tone conditions as given above is used, the lithium ion battery or the electrical double layer capacitor prepared by using such current collector would realize a further superior high rate characteristics and long lifetime. Here, the value of L* may be in the range of two values selected from −5t+25, −5t+30, −5t+35, −5t+40, −5t+45, −5t+50, −5t+55, −5t+60, −5t+65, and −5t+70.

In addition, among the color tone of the surface of the resin layer possessing conductivity, when a* satisfies the condition of −0.01t−0.3≤a*≤−0.01t+0.7, a fine balance is realized by the effects from each factors of the microscopic states of the coatings on the conductive substrate, dispersion state of the conductive material in the conductive resin layer, oxidization state of the resin and the like having an influence on each other, provided that the values of L* and b* are in the predetermined range with respect to the thickness t (μm) of the resin layer possessing conductivity. Accordingly, it is preferable since when a current collector which satisfies the color tone conditions as given above is used, the lithium ion battery or the electrical double layer capacitor prepared by using such current collector would realize a further superior high rate characteristics and long lifetime. Here, the value of a* may be in the range of two values selected from −0.01t− 0.3, −0.01t−0.4, −0.01t−0.5, −0.01t−0.6, and −0.01t−0.7.

In addition, among the color tone of the surface of the resin layer possessing conductivity, when b* satisfies the condition of 0.01t≤b*≤0.01t+1, a fine balance is realized by a complex transaction of the effects from each factors of the microscopic states of the coatings on the conductive substrate, dispersion state of the conductive material in the conductive resin layer, oxidization state of the resin and the like, provided that the values of L* and a* are in the predetermined range with respect to the thickness t (μm) of the resin layer possessing conductivity. Accordingly, it is preferable since when a current collector which satisfies the color tone conditions as given above is used, the lithium ion battery or the electrical double layer capacitor prepared by using such current collector would realize a further superior high rate characteristics and long lifetime. Here, the value of b* may be in the range of two values selected from 0.01t, 0.01t+0.1, 0.01t+0.2, 0.01t+0.3, 0.01t+0.4, 0.01t+0.5, 0.01t+ 0.6, 0.01t+0.7, 0.01t+0.8, 0.01t+0.9, and 0.01t+1.

<4. Electrode Structure>

The electrode structure of the present embodiment can be obtained by forming an active material layer or an electrode material layer on at least one side of the current collector of the present embodiment. An electrode structure having formed thereon an electrode material layer, which is used for an electrical storage device, will be described later. First, concerning an electrode structure having formed thereon an active material layer, a non-aqueous electrolyte battery can be prepared with the electrode structure, a separator, a non-aqueous electrolyte and the like. In the non-aqueous electrolyte battery and the electrode structure of the present invention, conventional parts for the non-aqueous battery can be used for the parts other than the current collector.

The active material layer formed in the present embodiment may be the ones conventionally suggested for the non-aqueous electrolyte battery. For example, a paste can be prepared by using $LiCoO_2$, $LiMnO_2$, $LiNiO_2$ and the like as the active material, carbon black such acetylene black and the like as the conductive material, and then dispersing them in PVDF as the binder. The paste thus obtained is coated on the current collector of the present invention to give the positive electrode structure of the present embodiment.

In addition, a paste can be prepared by using black lead (graphite), graphite, mesocarbon microbeads and the like as the active material, dispersing the active material in CMC as the thickener, and then mixing the dispersion with SBR as the binder. The paste thus obtained is coated on the current collector of the present invention which uses a copper foil as the conductive substrate to give the negative electrode structure of the present invention.

<5. Non-Aqueous Electrolyte Battery>

A separator is sandwiched in between the positive electrode structure and the negative electrode structure to constitute the non-aqueous electrolyte battery of the present embodiment. Here, the separator is immersed in an electrolyte for a non-aqueous electrolyte battery, containing a non-aqueous electrolyte. As the non-aqueous electrolyte and the separator, conventional ones used for the non-aqueous electrolyte battery can be used. For example, as the solvent of the electrolyte, carbonates, lactones and the like can be used. Here, $LiPF_6$ or $LiBF_4$ as electrolytes dissolved in a mixture of EC (ethylene carbonate) and EMC (ethylmethyl carbonate) can be used. As the separator, a membrane made of polyolefin having microporous can be used for example.

<6. Electrical Storage Device (Electrical Double Layer Capacitor, Lithium Ion Capacitor and the Like)>

The current collector of the present embodiment can be applied to an electrical storage device such as an electrical double layer capacitor, a lithium ion capacitor and the like, which require discharge at a large current density. The electrode structure for the electrical storage device of the present embodiment can be obtained by forming an electrode material layer on the current collector of the present embodiment. The electrical storage device such as the electrical double layer capacitor, the lithium ion capacitor and the like can be manufactured with the electrode structure, a separator, an electrolyte and the like. In the electrode structure and the electrical storage device of the present embodiment, conventional parts for the electrical double layer capacitor or the lithium ion capacitor can be used for the parts other than the current collector.

The positive electrode material layer and the negative electrode material layer both comprise an electrode material, a conductive material, and a binder. In the present invention, the electrode structure can be obtained by forming the electrode material layer on at least one side of the current collector of the present embodiment. Here, as the electrode material, the ones conventionally used as the electrode material for the electrical double layer capacitor, or the lithium ion capacitor can be used. For example, carbon powder such as active charcoal, black lead (graphite) and the like, or carbon fiber can be used. As the conductive material, carbon black such as acetylene black can be used. As the binder, for example, PVDF (polyvinylidene fluoride), or SBR (styrene butadiene rubber) can be used. In addition, the electrical storage device of the present invention can construct an electrical double layer capacitor or a lithium ion capacitor by fixing a separator in between the electrode structures of the present invention, and then immersing the separator in the electrolyte solution. As the separator, a membrane made of polyolefin having microporous, a non-woven fabric for an electrical double layer capacitor and the like can be used for example. Regarding the electrolyte solution, carbonates and lactones can be used as the solvent for example, and tetraetylammonium salt, triethylmethylammonium salt and the like can be used as the electrolyte, and hexafluorophosphate, tetrafluoroborate and the like can be used as the negative ion. Lithium ion capacitor is structured by combining a negative electrode of a lithium ion battery and a positive electrode of an electrode double layer capacitor. There is no particular limitation with respect to the manufacturing method, except that the current collector of the present embodiment is used.

The embodiments of the present invention have been described above. Here, the embodiments are merely an exemplification of the present invention, and thus the present invention may adopt various compositions other than the ones described above.

EXAMPLES

The present invention will be described in details with reference to Examples, however, the present invention shall not be limited to the Examples.

(1) Preparation of Current Collector

Examples 1 to 8, Comparative Examples 1 to 2

Hydroxy alkyl chitosan (weight molecular average weight of 80000) and various organic acids shown in Table 1 were dissolved in normal methyl 2-pyrolidone (NMP), and then a conductive material shown in Table 1 was dispersed for 8 hours using a ball mill to obtain a coating. The coating thus obtained was coated on one side of an aluminum foil (JIS A1085) with a thickness of 20 μm using a bar coater. The coating was then baked under the conditions shown in Table 1. The temperatures given in Table 1 are all final temperature of the substrates.

Examples 9 to 10, Comparative Example 3

An acryl copolymer (weight average molecular weight of 110000) containing a monomer was dispersed in water using a surfactant to give a resin solution, and then a conductive material shown in Table 1 was added with respect to the solid content of the resin, followed by dispersion with a ball mill to give a coating. The coating thus obtained was coated on one side of an aluminum foil (JIS A1085) with a thickness of 20 μm using a bar coater. The coating was baked under the conditions shown in Table 1, and thus the current collector was obtained. The temperatures given in Table 1 are all final temperature of the substrates.

Example 11

Soluble nitrocellulose (JIS K6703L1/4) and a resin shown in Table 1 were dissolved in methyl ethyl ketone (MEK), and then a conductive material shown in Table 1 was dispersed for 8 hours using a ball mill to obtain a coating. The weight of the soluble nitrocellulose is the weight of solid content. The coating thus obtained was coated on one side of an aluminum foil (JIS A1085) with a thickness of 20 μm using a bar coater. The coating was then baked under the conditions shown in Table 1. The temperatures given in Table 1 are all final temperature of the substrates.

TABLE 1

| | | Resin 1 Type | Weight Average Molecular Weight | Formulation (Parts by Mass) | 2 Type | Weight Average Molecular Weight of Copolymer | Formulation (Parts by Mass) | 3 Type | Formulation (Parts by Mass) | Weight Average Molecular Weight of Acryl Copolymer and Number Average Molecular Weight of Melamine Resin |
|---|---|---|---|---|---|---|---|---|---|---|
| Example | 1 | Hydroxy Alkyl Chitosan | 80000 | 50 | Pyromellitic Acid | — | 50 | — | — | — |
| | 2 | Hydroxy Alkyl Chitosan | 80000 | 50 | Pyromellitic Acid | — | 50 | — | — | — |
| | 3 | Hydroxy Alkyl Chitosan | 80000 | 50 | Pyromellitic Acid | — | 50 | — | — | — |
| | 4 | Hydroxy Alkyl Chitosan | 80000 | 50 | Pyromellitic Acid | — | 50 | — | — | — |
| | 5 | Hydroxy Alkyl Chitosan | 80000 | 50 | Pyromellitic Acid | — | 50 | — | — | — |
| | 6 | Hydroxy Alkyl Chitosan | 80000 | 50 | Pyromellitic Acid | — | 50 | — | — | — |
| | 7 | Hydroxy Alkyl Chitosan | 80000 | 50 | Pyromellitic Acid | — | 50 | — | — | — |
| | 8 | Hydroxy Alkyl Chitosan | 80000 | 50 | Pyromellitic Acid | — | 80 | — | — | — |
| | 9 | Methacrylic Acid | — | 5 | Methyl Acrylate | — | 30 | Acryl Amide | 65 | 110000 |
| | 10 | Methacrylic Acid | — | 5 | Methyl Acrylate | — | 30 | Acryl Amide | 65 | 110000 |
| | 11 | Soluble Nitrocellulose (JIS K6703L1/4) | — | 54 | Acrylic Copolymer (Methacrylic Acid:Methyl Acrylate = 5:95) | 70000 | 21 | Methylated Melamine | 15 | 2100 |
| Comparative Example | 1 | Hydroxy Alkyl Chitosan | 80000 | 50 | Pyromellitic Acid | — | 50 | — | — | — |
| | 2 | Hydroxy Alkyl Chitosan | 80000 | 50 | Pyromellitic Acid | — | 80 | — | — | — |
| | 3 | Methacrylic Acid | — | 5 | Methyl Acrylate | — | 30 | Acryl Amide | 65 | 110000 |

| | | Conductive Material | | Baking Condition | | Coating |
|---|---|---|---|---|---|---|
| | | Type | Formulation (Parts by Mass) | Temperature (° C.) | Time (seconds) | Thickness (μm) |
| Example | 1 | Acetylene Black | 54 | 170 | 100 | 1.2 |
| | 2 | Acetylene Black | 60 | 170 | 100 | 1.3 |
| | 3 | Acetylene Black | 73 | 170 | 100 | 1.2 |
| | 4 | Acetylene Black | 88 | 170 | 100 | 1.3 |
| | 5 | Acetylene Black | 80 | 170 | 100 | 3.0 |
| | 6 | Acetylene Black | 101 | 170 | 100 | 3.0 |
| | 7 | Acetylene Black | 32 | 170 | 100 | 3.0 |
| | 8 | Acetylene Black | 35 | 170 | 100 | 3.0 |
| | 9 | Acetylene Black | 43 | 110 | 100 | 0.9 |
| | 10 | Acetylene Black | 43 | 243 | 100 | 0.9 |
| | 11 | Acetylene Black | 54 | 150 | 100 | 1.1 |

TABLE 1-continued

| | | | | | | |
|---|---|---|---|---|---|---|
| Comparative | 1 | Acetylene Black | 10 | 170 | 100 | 0.5 |
| Example | 2 | Acetylene Black | 120 | 230 | 100 | 4.6 |
| | 3 | Acetylene Black | 16 | 250 | 100 | 2.3 |

Here, in Table 1, film thickness measuring machine "HAKATTARO G" (available from SEIKO-em) was used to calculate the thickness of the resin layer as a difference in the thickness between the portion formed with the resin layer and the portion without the resin (portion only with the aluminum foil).

(2) Evaluation Method (2-1) Color Tone

A color meter (SM-3-MCH, available from Suga Test Instruments Co., Ltd.) was used, with the measuring conditions of measurement mode d/8 and aperture 30 mmΦ, to measure $L^*$, $a^*$, and $b^*$. The results are shown in Table 2.

(2-2) Evaluation of Discharge Rate Characteristics and Electrode Lifetime of Lithium Ion Battery
(Preparation of Lithium Ion Battery)

A positive electrode was prepared as follows. A paste was prepared by dispersing LiCoO2 as an active material and acetylene black as a conductive material in PVDF (polyvinylidene fluoride) as a binder. The paste thus obtained was coated on the current collector electrode so that the thickness of the coating is 70 μm, to give the positive electrode. A negative electrode was prepared as follows. A paste was prepared by dispersing black lead (graphite) as an active material in CMC (carboxymethyl cellulose), followed by the addition of SBR (styrene butadiene rubber) as a binder. The paste thus obtained was coated on a copper foil with a thickness of 20 μm so that the thickness of the coating is 70 μm, to give the negative electrode. A microporous separator made of polypropylene was sandwiched by these electrode structures, and was then cased in the battery casing to obtain a coin battery. A 1 mol/L solution of $LiPF_6$ in a solvent mixture of EC (ethylene carbonate) and EMC (ethylmethyl carbonate) was used as the electrolyte solution.

(Method for Evaluating Discharge Rate Characteristics)

Discharge capacity of these lithium ion batteries (based on 0.2 C, unit %) was observed for the discharge current rate of 1 C, 5 C, 10 C, and 20 C, when the upper voltage limit of charged state was 4.2 V, charge current was 0.2 C, discharge final voltage was 2.8 V, and the temperature was 25° C. (Here, 1 C is the value of the current (A) when the current capacity (Ah) of the battery is taken out in 1 hour (h). At 20 C, the current capacity of the battery can be taken out in 1/20 h=3 min. On the other hand, the battery can be charged in 3 minutes.) The results are shown in Table 2.

(Method for Evaluating Lifetime of Electrode)

The battery was first charged at an electrolyte solution temperature of 40° C., upper limit voltage of 4.2V, and a charging current of 20 C. Then the battery was discharged to a final voltage of 2.8V, at a discharging current of 20 C. Number of cycles when the discharge capacity reaches 60% of the discharge capacity of the first cycle was observed (maximum 500 cycles), and was evaluated in accordance with the following criteria. The results are shown in Table 2.
A: 500 cycles or more
B: 450 cycles or more and less than 500 cycles
C: 400 cycles or more and less than 450 cycles
D: less than 400 cycles (2-3) Evaluation of Discharge Rate Characteristics and Electrode Lifetime of Electrical Double Layer Capacitor
(Preparation of Electrical Double Layer Capacitor)

A paste was prepared by dispersing activated charcoal as an electrode material and Ketjen black as a conductive material in PVDF as a binder. The paste thus obtained was coated on the current collector electrode so that the thickness of the coating is 70 μm, to give the positive and negative electrode structure. A non-woven fabric for an electrical double layer capacitor was sandwiched and fixed by two of these electrode structures, and thus the electrical double layer capacitor was structured. A solution obtained by adding 1.5 mol/L solution of TEMA (triethylmethyl ammonium) and tetrafluoroboric acid in propylene carbonate as a solvent was used as the electrolyte solution.

(Method for Evaluating Discharge Rate Characteristics)

Discharge capacity of these lithium ion batteries (based on 1 C, unit %) was observed for the discharge current rate of 100 C, 300 C, and 500 C, when the upper voltage limit of charged state was 2.8 V, charge current was 1 C, condition for the completion of charging was 2 hours, discharge final voltage was 0 V, and the temperature was 25° C. The results are shown in Table 2.

(Method for Evaluating Lifetime of Electrode)

The battery was first charged at an electrolyte solution temperature of 40° C., upper limit voltage of 2.8V, and a charging current of 500 C. Then the battery was discharged to a final voltage of 0V, at a discharging current of 500 C. Number of cycles when the discharge capacity reaches 80% of the discharge capacity of the first cycle (maximum 5000 cycles) was evaluated in accordance with the following criteria. The results are shown in Table 2.
A: 5000 cycles or more
B: 4500 cycles or more and less than 5000 cycles
C: 4000 cycles or more and less than 4500 cycles
D: less than 4000 cycles

TABLE 2

| | | Color Tone | | | Grade of Discharge Rate Characteristics | Discharge Rate Characteristics | | | | | | Lifetime | |
|---|---|---|---|---|---|---|---|---|---|---|---|---|---|
| | | | | | | Lithium Ion Battery | | | Electrical Double Layer Capacitor | | | Lithium Ion Battery | Electrical Double Layer Capacitor |
| | | $L^*$ | $a^*$ | $b^*$ | | 5 C | 10 C | 20 C | 100 C | 300 C | 500 C | | |
| Example | 1 | 60 | 0.17 | −0.10 | B | 95 | 88 | 81 | 97 | 86 | 83 | A | A |
| | 2 | 40 | 0.19 | 0.51 | A | 97 | 94 | 87 | 97 | 95 | 89 | A | A |
| | 3 | 19 | 0.20 | 0.12 | A | 96 | 92 | 88 | 98 | 92 | 88 | A | A |
| | 4 | 16 | 0.21 | 0.55 | B | 94 | 86 | 82 | 96 | 88 | 82 | A | A |
| | 5 | 10 | 0.23 | 0.58 | A | 97 | 85 | 86 | 96 | 92 | 88 | A | A |
| | 6 | 8 | 0.98 | 0.60 | B | 91 | 89 | 84 | 96 | 87 | 84 | A | A |

TABLE 2-continued

|  |  | Color Tone | | | Grade of Discharge Rate Characteristics | Discharge Rate Characteristics | | | | | | Lifetime | |
| --- | --- | --- | --- | --- | --- | --- | --- | --- | --- | --- | --- | --- | --- |
|  |  | | | | | Lithium Ion Battery | | | Electrical Double Layer Capacitor | | | Lithium Ion Battery | Electrical Double Layer Capacitor |
|  |  | L* | a* | b* |  | 5 C | 10 C | 20 C | 100 C | 300 C | 500 C | | |
|  | 7 | 58 | 0.21 | 0.52 | C | 88 | 82 | 76 | 95 | 82 | 79 | B | B |
|  | 8 | 55 | 0.20 | 0.51 | B | 92 | 87 | 83 | 97 | 88 | 84 | A | A |
|  | 9 | 56 | −1.00 | 0.60 | C | 87 | 85 | 77 | 94 | 84 | 78 | B | B |
|  | 10 | 54 | −0.78 | 2.90 | C | 86 | 84 | 77 | 94 | 83 | 77 | B | B |
|  | 11 | 31 | 0.03 | −0.99 | C | 87 | 81 | 78 | 93 | 85 | 78 | B | B |
| Comparative Example | 1 | 62 | −1.10 | −1.10 | F | 77 | 69 | 56 | 86 | 67 | 56 | D | D |
|  | 2 | 7 | 1.10 | 0.87 | F | 77 | 68 | 57 | 87 | 68 | 58 | D | D |
|  | 3 | 36 | −0.62 | 3.20 | F | 76 | 67 | 56 | 88 | 57 | 59 | D | D |

<Discussion on Results>

From the experimental results of the Examples and Comparative Examples, it can be concluded that when a current collector having a conductive resin layer which satisfies the color tone conditions as given above is used, the lithium ion battery and the electrical double layer capacitor prepared by using such current collector would realize superior high rate characteristics and long lifetime. Therefore, a current collector having superior performance can be selected with high accuracy merely by conducting a simple non-destructive test which measures the color tone conditions of the resin layer possessing conductivity, without actually preparing the lithium ion battery or the electrical double layer capacitor.

The present invention has been described with reference to the Examples. These Examples are merely an exemplification, and it should be noted that there are various possible alteration for the present invention and such alteration are also included in the present invention.

For example, in the Examples, acetylene black was used as the conductive material, however, other conductive material may be used so long as its major component is carbon. In such case, so long as the major component of the conductive material is carbon, the lithium ion battery and the electrical double layer capacitor prepared by using such current collector would realize superior high rate characteristics and long lifetime, provided that a current collector having a conductive resin layer which satisfies the color tone conditions as given above is used.

The invention claimed is:

1. A current collector comprising:
   a conductive substrate, and
   a resin layer possessing conductivity provided on at least one side of the conductive substrate; wherein
   the resin layer possessing conductivity includes a conductive particle and a resin;
   an amount of the conductive particle is 60 to 80 parts by mass with respect to 100 parts by mass of the resin;
   the resin contains a soluble nitrocellulose-based resin; and
   a color tone of a surface of the resin layer possessing conductivity specified with L*a*b* color system, satisfies the following conditions of:

$L^* \leq 60$ $1.0 \leq a^* \leq 1.0$ $-1.0 \leq b^* \leq 3.0$.

2. The current collector of claim 1, wherein the color tone satisfies the following conditions, with respect to a thickness t (μm) of the resin layer possessing conductivity:

$-5t+25 \leq L^* \leq -5t+70$ $-0.01t-0.3 \leq a^* \leq -0.01t+0.7$ $0.01t \leq b^* \leq 0.01t+1$.

3. The current collector of claim 1, wherein the conductive particle contains carbon.

4. The current collector of claim 1, wherein the surface of the resin layer possessing conductivity is exposed.

5. An electrode structure comprising:
   the current collector of claim 1, and
   an active material layer or an electrode material layer formed on the resin layer possessing conductivity.

6. A non-aqueous electrolyte battery, an electrical double layer capacitor, a lithium ion capacitor, or an electrical storage device, comprising the electrode structure of claim 5.

* * * * *

UNITED STATES PATENT AND TRADEMARK OFFICE
CERTIFICATE OF CORRECTION

PATENT NO.        : 9,659,716 B2
APPLICATION NO.   : 14/235785
DATED             : May 23, 2017
INVENTOR(S)       : O. Kato et al.

Page 1 of 1

It is certified that error appears in the above-identified patent and that said Letters Patent is hereby corrected as shown below:

In the Claims

| Column | Line | Error |
|---|---|---|
| 18 (Claim 1, | 28 Line 32) | "$1.0 \leq a^* \leq 1.0$" should read -- $-1.0 \leq a^* \leq 1.0$ -- |

Signed and Sealed this
Seventh Day of November, 2017

Joseph Matal
*Performing the Functions and Duties of the*
*Under Secretary of Commerce for Intellectual Property and*
*Director of the United States Patent and Trademark Office*